United States Patent
Chen et al.

(10) Patent No.: US 12,391,573 B1
(45) Date of Patent: Aug. 19, 2025

(54) PREPARATION METHOD FOR INJECTED LITHIUM MANGANESE IRON PHOSPHATE CATHODE MATERIAL, ELECTRODE AND LITHIUM BATTERY

(71) Applicant: Hunan Yuneng new energy battery materials Co., LTD., Xiangtan (CN)

(72) Inventors: Tao Chen, Xiangtan (CN); Fenglei Yu, Xiangtan (CN); Jiangtao Cheng, Xiangtan (CN); Zhilin Long, Xiangtan (CN); Tao Lin, Xiangtan (CN); Ningxin Zhao, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 19/015,587

(22) Filed: Jan. 9, 2025

(30) Foreign Application Priority Data

Jul. 16, 2024 (CN) .......................... 202410952044.8

(51) Int. Cl.
*H01M 4/04* (2006.01)
*C01G 49/00* (2006.01)
(Continued)

(52) U.S. Cl.
CPC ............ *C01G 49/009* (2013.01); *H01M 4/04* (2013.01); *H01M 4/50* (2013.01); *H01M 4/505* (2013.01); *H01M 4/5825* (2013.01); *H01M 10/052* (2013.01); *C01P 2004/90* (2013.01); *C01P 2006/40* (2013.01); *H01M 10/0525* (2013.01)

(58) Field of Classification Search
CPC .. H01M 10/052; H01M 10/0525; H01M 4/04; H01M 4/5825; H01M 4/50; H01M 4/505
See application file for complete search history.

(56) References Cited

U.S. PATENT DOCUMENTS

| | | | |
|---|---|---|---|
| 2004/0185343 A1* | 9/2004 | Wang | H01M 4/362 252/182.1 |
| 2019/0067697 A1* | 2/2019 | Ohsawa | H01M 10/0525 |
| 2021/0075001 A1* | 3/2021 | Oleshko | H01M 50/446 |

FOREIGN PATENT DOCUMENTS

CN 116435591 A 7/2023

OTHER PUBLICATIONS

Translation plus original of Huang (CN 101521278) (Year: 2009).*

(Continued)

*Primary Examiner* — Jeremiah R Smith
(74) *Attorney, Agent, or Firm* — Valet Patent Service Limited

(57) ABSTRACT

The present application belongs to the field of lithium battery technology, particularly relating to a preparation method for injected lithium manganese iron phosphate cathode material, electrodes, and lithium batteries. The method comprises: mixing, grinding, and drying lithium source, iron source, phosphorus source, and carbon source to obtain a lithium iron phosphate precursor; The lithium iron phosphate precursor is subjected to a first stage sintering and a second stage sintering in an inert gas atmosphere to obtain lithium iron phosphate material; The lithium iron phosphate material is processed into a flaky form, and manganese ions are implanted on both sides of the flaky lithium iron phosphate material in a preset vacuum degree environment to obtain lithium manganese iron phosphate cathode material.

11 Claims, 1 Drawing Sheet

--- mixing lithium source, iron source, phosphorus source, and carbon source, grinding and drying to obtain a lithium iron phosphate precursor — S1

↓ subjecting the lithium iron phosphate precursor to a first and second stage sintering in an inert gas atmosphere to obtain lithium iron phosphate material — S2

↓ processing the lithium iron phosphate material into a flaky form, and performing ion implantation of manganese ions on both sides of the flaky lithium iron phosphate material in a preset vacuum degree environment to obtain lithium manganese iron phosphate cathode material — S3

(51) Int. Cl.
*H01M 4/50* (2010.01)
*H01M 4/505* (2010.01)
*H01M 4/58* (2010.01)
*H01M 10/052* (2010.01)
H01M 10/0525 (2010.01)

(56) References Cited

OTHER PUBLICATIONS

Translation plus original of Xiao (CN 104037411) (Year: 2014).*
Translation plus original of Bao (CN 118833791) (Year: 2024).*
Translation plus original of Kim (KR 2024072723) (Year: 2024).*
Material reports, 2020,vol. 34,No. 8,Preparation of Lithium Manganese Iron Phosphate Cathode Material by Improved High-temperature Solid-state Method, Li Jing,Qin Yuanbin,Ning Xiaohui, Jun. 29, 2020.

* cited by examiner

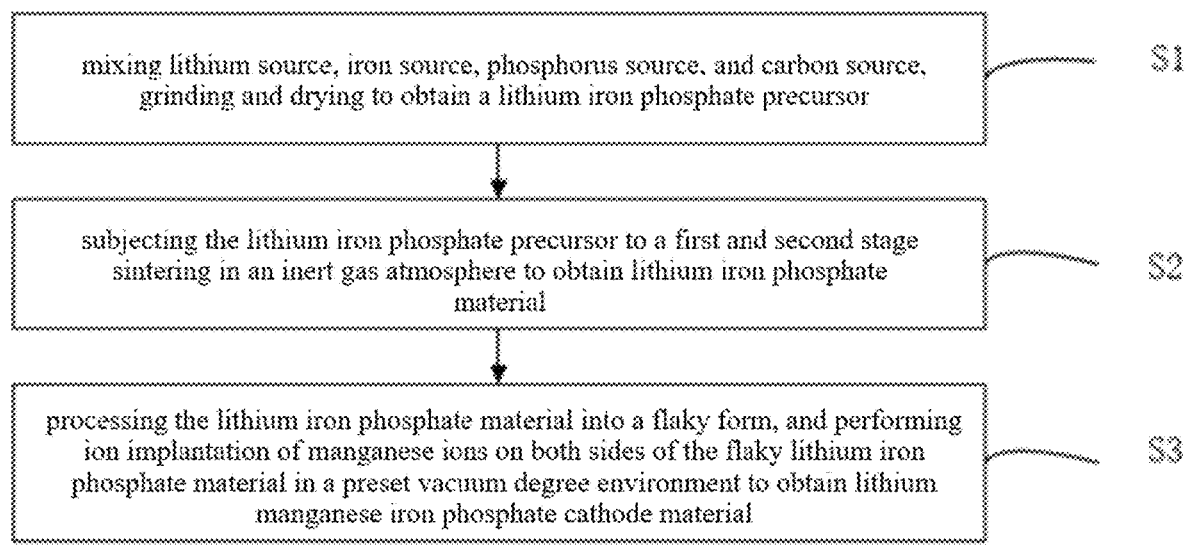

PREPARATION METHOD FOR INJECTED LITHIUM MANGANESE IRON PHOSPHATE CATHODE MATERIAL, ELECTRODE AND LITHIUM BATTERY

TECHNICAL FIELD

The present application belongs to the field of lithium battery technology, particularly relating to a preparation method for injected lithium manganese iron phosphate cathode material, electrode and lithium battery.

BACKGROUND

Lithium iron phosphate ($LiFePO_4$) material has a relatively large theoretical specific capacity of 170 mAh/g and a stable charge-discharge platform, but the ionic conductivity of lithium iron phosphate is low.

Currently, to improve the performance of lithium iron phosphate material, existing technologies often use doping methods to enhance conductivity. For example, the publication number CN102368554A uses an ion implanter to incorporate yttrium elements into the precursor mixed powder. However, the doping positions of the doped elements in the lithium iron phosphate material prepared by the current method are disordered. Some mixed powders have high doping concentrations, while others have low doping concentrations, and the discharge specific capacity of the resulting doped lithium iron phosphate material is not high enough to meet market demands.

The existing technology has problems with the disordered doping positions, inconsistent doping concentrations, and insufficient discharge specific capacity of the doped lithium iron phosphate material obtained through preparation.

SUMMARY

The present application provides a preparation method for injected lithium manganese iron phosphate cathode material, an electrode, and a lithium battery, aiming to address issues such as disordered doping positions, inconsistent doping concentrations, and insufficient discharge specific capacity in the doped lithium iron phosphate material obtained through preparation.

In the first aspect, the present application example provides a preparation method for lithium manganese iron phosphate cathode material, comprising:
  mixing lithium source, iron source, phosphorus source, and carbon source, grinding and drying to obtain a lithium iron phosphate precursor;
  subjecting the lithium iron phosphate precursor to a first and second stage sintering in an inert gas atmosphere to obtain lithium iron phosphate material;
  processing the lithium iron phosphate material into a flaky form, and performing ion implantation of manganese ions on both sides of the flaky lithium iron phosphate material in a preset vacuum degree environment to obtain lithium manganese iron phosphate cathode material.

The preparation method of a lithium manganese iron phosphate cathode material provided in the present application involves initially mixing, grinding, and drying the lithium source, iron source, phosphorus source, and carbon source using a solid-state method. This is followed by a first and second stage sintering in an inert gas atmosphere to obtain lithium iron phosphate material. Subsequently, a metal ion implantation method is used to implant manganese ions on both sides of the flaky lithium iron phosphate material in a preset vacuum degree environment, resulting in lithium manganese iron phosphate cathode material. Compared to existing technologies, the preparation method in the present application results in carbon-coated lithium iron phosphate material after the two-stage sintering. It allows for the controlled incorporation of metal manganese ions into target positions within the flaky lithium iron phosphate material under a preset vacuum degree environment. Additionally, it accurately controls the implantation depth and concentration of metal manganese ions in the flaky lithium iron phosphate material, improving the uniformity of manganese ion doping in the lithium iron phosphate material and enhancing the doping degree of manganese ions at the iron sites in the lithium iron phosphate material. Simultaneously, during the manganese ion doping process, the band gap width of lithium iron phosphate is reduced, thereby increasing the conductivity of the lithium manganese iron phosphate material, which in turn enhances the discharge specific capacity of lithium batteries made with lithium manganese iron phosphate cathode material. Experimental verification shows that the 0.1 C discharge specific capacity of lithium batteries made with the lithium manganese iron phosphate cathode material prepared in the present application can reach 161.2 mAh/g.

In a second aspect, the embodiments of the present application provide an electrode that comprises lithium manganese iron phosphate cathode material obtained by any of the preparation methods described in the first aspect.

In the present application example, the lithium manganese iron phosphate cathode material is prepared by doping manganese metal ions into the lithium iron phosphate material through metal ion implantation to make the electrode. This reduces the band gap width of lithium iron phosphate, thereby increasing the conductivity of the lithium manganese iron phosphate material, and consequently enhancing the discharge specific capacity of the lithium battery made from the lithium manganese iron phosphate cathode material.

In the third aspect, the present application example provides a lithium battery, where the cathode of the lithium battery is made from the lithium iron phosphate cathode material obtained by the preparation method described in any item of the first aspect.

In the present application, a lithium manganese iron phosphate cathode material is prepared by doping manganese metal ions into lithium iron phosphate material through metal ion implantation to make the electrode of a lithium battery. This reduces the band gap width of lithium iron phosphate, thereby increasing the conductivity of the lithium manganese iron phosphate material, and consequently improving the discharge specific capacity of the lithium battery.

BRIEF DESCRIPTION OF THE DRAWINGS

In order to more clearly illustrate the technical solutions in the examples of the present application, the drawings required for the description of the examples or existing technologies will be briefly introduced below. It is evident that the drawings described below are merely some examples of the present application. For those skilled in the art, other drawings can be obtained based on these drawings without creative effort.

FIG. 1 is a schematic flow diagram of the preparation method for the lithium manganese iron phosphate cathode material provided in an embodiment of the present application.

DETAILED DESCRIPTION

To make the technical problems, technical solutions, and beneficial effects to be solved by the present application clearer, the following provides a further detailed description of the present application in conjunction with examples. It should be understood that the specific embodiments described herein are merely for explaining the present application and are not intended to limit it.

In the present application, the term "and/or" describes the associative relationship of associated objects, indicating that three relationships may exist. For example, A and/or B can indicate: the presence of A alone, the presence of both A and B, or the presence of B alone. Here, A and B can be singular or plural. The character "/" generally indicates an 'or' relationship between the associated objects.

In the present application, "at least one" means one or more, and 'multiple' means two or more. "At least one of the following" or similar expressions refer to any combination of these items, comprising any single item or any combination of multiple items. For example, "at least one of a, b, or c", or "at least one of a, b, and c", can mean: a, b, c, a~b (i.e., a and b), a~c, b~c, or a~b~c, where a, b, and c can each be singular or plural.

The terms "first" and "second" are used solely for descriptive purposes to distinguish one object from another and should not be understood as indicating or implying relative importance or implicitly specifying the number of indicated technical features. For example, without departing from the scope of the implementation regulations of the present application, the first XX may also be referred to as the second XX, and similarly, the second XX may also be referred to as the first XX. Thus, features defined as "first" or "second" may explicitly or implicitly comprise one or more of such features.

The terms used in the embodiments of the present application are solely for the purpose of describing specific implementation regulations and are not intended to limit the present application. The singular forms "a", "the", and "this" as used in the implementation regulations of the present application and the appended claims are also intended to comprise the plural forms unless the context clearly indicates otherwise.

It should be understood that in various embodiments of the present application, the size of the sequence numbers of the processes does not imply the order of execution. Some or all steps can be executed in parallel or sequentially. The execution order of the processes should be determined by their function and inherent logic and should not impose any limitation on the implementation process of the embodiments of the present application.

The weight of the relevant components mentioned in the specification of the embodiments of the present application can not only refer to the specific content of each component but also represent the proportional relationship between the weights of the components. Therefore, as long as the content of the relevant components in the specification of the embodiments of the present application is proportionally enlarged or reduced, it falls within the scope disclosed in the specification of the embodiments of the present application. Specifically, the mass described in the specification of the present application example can be in units commonly known in the chemical field, such as g, mg, g, kg, etc.

Unless otherwise defined, all technical terms used below have the same meaning as commonly understood by those skilled in the art. The technical terms used herein are only for the purpose of describing specific embodiments and are not intended to limit the scope of the present invention.

Unless otherwise specified, various raw materials, reagents, instruments, and equipment used in the present application can be purchased on the market or prepared by existing methods.

The band gap width is the energy difference between the valence band and the conduction band in semiconductor materials. The valence band refers to the energy level where electrons are at a low energy state and cannot participate in current conduction; The conduction band refers to the energy level where electrons are at high energy and can freely participate in current conduction.

Currently, to improve the performance of lithium iron phosphate materials, existing technologies often use ion doping methods at lithium or iron sites. The preparation methods for doped lithium iron phosphate materials comprise solid-state method, sol-gel method, microwave method, hydrothermal method, carbothermal reduction method, and spray pyrolysis method, among others. However, the doping positions of the doped elements in the lithium iron phosphate materials prepared by current methods are disordered. Some mixed powders have high doping concentrations, while others have low doping concentrations. Additionally, the discharge specific capacity of the obtained doped lithium iron phosphate materials is not high enough, leaving a certain gap from the theoretical specific capacity, which cannot meet market demands.

To address the issues of disordered doping positions, inconsistent doping concentrations, and insufficient discharge specific capacity in the doped lithium iron phosphate material obtained through preparation, which cannot meet the requirements, the first aspect of the present application provides a preparation method for lithium manganese iron phosphate cathode material, comprising:

S1. mixing lithium source, iron source, phosphorus source, and carbon source, grinding and drying to obtain a lithium iron phosphate precursor;

S2. subjecting the lithium iron phosphate precursor to a first and second stage sintering in an inert gas atmosphere to obtain lithium iron phosphate material;

S3. processing the lithium iron phosphate material into a flaky form, and performing ion implantation of manganese ions on both sides of the flaky lithium iron phosphate material in a preset vacuum degree environment to obtain lithium manganese iron phosphate cathode material.

The preparation method of a lithium manganese iron phosphate cathode material provided in the present application involves initially mixing, grinding, and drying the lithium source, iron source, phosphorus source, and carbon source using a solid-state method. This is followed by a first and second stage sintering in an inert gas atmosphere to obtain lithium iron phosphate material. Subsequently, a metal ion implantation method is used to implant manganese ions on both sides of the flaky lithium iron phosphate material in a preset vacuum degree environment, resulting in lithium manganese iron phosphate cathode material. Compared to existing technologies, the preparation method in the present application results in carbon-coated lithium iron phosphate material after the two-stage sintering. It allows for the controlled incorporation of metal manganese ions into target positions within the flaky lithium iron phosphate material under a preset vacuum degree environment. Additionally, it accurately controls the implantation depth and concentration of metal manganese ions in the flaky lithium iron phosphate material, improving the uniformity of manganese ion doping in the lithium iron phosphate material and enhancing the doping degree of manganese ions at the iron sites in the lithium iron phosphate material. Simultaneously, during the heavy doping of manganese ions, the lithium iron phosphate undergoes a band gap narrowing effect, thereby reducing the band gap width of lithium iron phosphate, which in turn increases the conductivity of the carbon-coated lithium manganese iron phosphate material, and consequently enhances the discharge specific capacity of the lithium battery made from the lithium manganese iron phosphate cathode material. In addition, by adding a certain amount of manganese element to the lithium iron phosphate cathode material, the synthesized lithium manganese iron phosphate has a higher voltage platform, reaching about 4.1V, while lithium iron phosphate is around 3.4V~3.5V. Due to the higher voltage of lithium manganese iron phosphate, its theoretical energy density is 15%~20% higher than that of lithium iron phosphate under the same conditions. Experimental verification shows that the lithium battery made from the lithium manganese iron phosphate cathode material prepared in the present application has a discharge specific capacity of 161.2 mAh/g at 0.1 C.

In some embodiments, manganese ions are used to perform ion implantation on both sides of flaky lithium iron phosphate material under a preset vacuum degree environment to obtain lithium manganese iron phosphate cathode material, comprising:

S31. using manganese ions to perform ion implantation on the first surface of the flaky lithium iron phosphate material in the preset vacuum degree environment until the preset depth is reached;

S31. using manganese ions to perform ion implantation on the second surface of the flaky lithium iron phosphate material in the preset vacuum degree environment until the preset depth is reached, obtaining the lithium manganese iron phosphate cathode material, where the second surface is opposite to the first surface; wherein, the manganese ions are implanted into the flaky lithium iron phosphate material to also reduce the band gap width of the lithium manganese iron phosphate cathode material; the preset depth is 1 μm~1.5 μm.

In this embodiment, the first surface refers to either of the two larger surfaces of the flaky lithium iron phosphate material. Manganese ions are doped into the first and second surfaces of the flaky lithium iron phosphate using ion implantation, reaching the preset depth. This alters the crystal structure and electronic configuration of the flaky lithium iron phosphate, reducing the energy between the valence band and the conduction band, thereby decreasing the band gap width. The reduction in band gap width allows electrons in lithium iron phosphate to transition from the valence band to the conduction band, participating in conduction, thus enhancing the conductivity of lithium iron phosphate. For example, the band gap width of undoped lithium iron phosphate is 0.765 eV After doping, when the ratio of Mn to Fe is 0.25:0.75, the band gap width of lithium iron phosphate is 0.443 eV.

In some embodiments, the molar ratio between lithium in the lithium source, manganese in the manganese ions, iron in the iron source, and phosphorus in the phosphorus source is (1.0~1.05):0.6:0.4:1. By preparing lithium manganese iron phosphate cathode material according to the molar ratio in this example, the advantages of lithium iron phosphate and lithium manganese phosphate can be balanced, thereby enhancing the electrochemical performance of lithium manganese iron phosphate.

In some embodiments, the structural formula of the lithium manganese iron phosphate precursor and lithium manganese iron phosphate cathode material is $LiMn_xFe_{(1-x)}PO_4$, where $0.2<X<1$; Since the ratio of manganese Mn and iron Fe in lithium manganese iron phosphate affects the performance of the lithium manganese iron phosphate cathode material, it is necessary to set the ratio of manganese Mn and iron Fe according to the battery requirements to improve the performance of the lithium battery as much as possible.

In some embodiments, the grinding is ball milling, with ball milling parameters: ball milling speed of 300 r/min~500 r/min, and ball milling time of 2.8 h~4.8 h; According to the ball milling speed and ball milling time of this example, the mixture of lithium source, iron source, phosphorus source, and carbon source can be ground to a uniform particle size to increase the contact area between the lithium source, iron source, phosphorus source, and carbon source. Specifically, the lithium source, iron source, phosphorus source, and carbon source are placed into a ball mill jar according to a preset stoichiometric ratio for mixing. In the presence of a ball milling medium and an alcohol environment, they are ball milled at a speed of 300 r/min~500 r/min for 2.8 h~4.8 h to obtain a uniformly mixed and particle-sized mixture.

In some examples, the first-stage sintering parameters are: sintering temperature of 320° C.-550° C., sintering time of 10 h~16 h; Second-stage sintering parameters: sintering temperature of 600° C.-900° C., sintering time of 12 h~18 h. The first-stage sintering temperature in this example allows the lithium iron phosphate precursor to react at an appropriate reaction rate, with the carbon source reducing iron and partially covering the lithium iron phosphate. A sintering temperature that is too low will result in a slow reaction rate, while a temperature that is too high will lead to an excessively fast reaction rate, causing incomplete reactions and excessive impurities; A sintering time facilitates the complete reaction of the mixture of lithium source, iron source, phosphorus source, and carbon source under the sintering temperature of this example. The two-stage sintering temperature in this example allows the mixture of lithium iron phosphate precursor and carbon source to react at an appropriate reaction rate. If the sintering temperature is too low, the reaction rate will be too slow, and if the sintering temperature is too high, the reaction rate will be too fast, leading to incomplete reactions and excessive impurities. The two-stage sintering time facilitates the complete reaction of the mixture of lithium iron phosphate precursor and carbon source under the sintering temperature of this example, enhancing the coating of the carbon source to improve the performance of the lithium manganese iron phosphate cathode material.

In some examples, the amount of carbon source is 15 wt %-18 wt % of the total weight of the lithium source, iron source, phosphorus source, and carbon source; The carbon source in this example is used to coat lithium iron phosphate particles during secondary sintering. Using the carbon source at the mass percentage in this example increases the conductivity of the lithium iron phosphate cathode material. Due to good coating, it also reduces the hygroscopicity of the lithium iron phosphate cathode material, thereby reducing the viscosity of the subsequent lithium iron phosphate cathode material processing, and thus lowering the production cost of lithium batteries.

In some examples, the thickness of the flaky lithium iron phosphate material is 3 μm~5 μm; Controlling the thickness of the flaky lithium iron phosphate material within the range of this example improves the area and uniformity of manganese ion doping distribution, thereby enhancing the conductivity of lithium manganese iron phosphate.

In some examples, the preset vacuum degree is less than or equal to $1\times10^{-4}$ Pa; The higher the vacuum degree, the more it prevents air contamination of lithium manganese iron phosphate during ion implantation, reducing impurities when doping metal manganese ions.

In some embodiments, the parameters for ion implantation are: ion voltage is 80 keV~150 keV, and the manganese ion implantation amount is $2\times10^9$ ions/cm$^2$~$5\times10^{11}$ ions/cm$^2$; The manganese ion implantation parameters used in this example reduce the band gap width of lithium iron phosphate, thereby increasing its conductivity. Furthermore, the manganese ion implantation amount is $8\times10^{10}$ ions/cm$^2$, which further reduces the band gap width of lithium iron phosphate, thereby increasing its conductivity and enhancing the 0.1 C discharge specific capacity of the lithium battery to 161.2 mAh/g.

In some embodiments, the inert gas comprises at least one of nitrogen, argon, or helium. Segmented sintering is conducted in an inert gas atmosphere to prevent air from participating in the reaction, thereby reducing impurities in the lithium iron phosphate material.

In some embodiments, the lithium source is one or more combinations of lithium carbonate, lithium hydroxide, or lithium dihydrogen phosphate. And/or, the iron source is one or more combinations of ferric oxide, iron phosphate, ferrous oxalate, and ferrous acetate. And/or, the phosphorus source is one or more combinations of lithium dihydrogen phosphate, ammonium hydrogen phosphate, ammonium dihydrogen phosphate, and phosphoric acid. And/or, the carbon source is one or more combinations of glucose, sucrose, polyethylene glycol, maltose, phenolic resin, carbon nanotubes, and epoxy resin. The multiple sources of the iron source in this example can be selected as one or more combinations according to the requirements to prepare lithium manganese iron phosphate cathode material. The multiple sources of the phosphorus source can be selected as one or more combinations according to the requirements to prepare lithium manganese iron phosphate cathode material. Multiple sources of lithium can be selected in one or more combinations according to the requirements to prepare lithium manganese iron phosphate cathode material; multiple sources of the above raw materials can also reduce production costs. Exemplarily, the lithium source is lithium carbonate, the iron source is ferrous oxalate, the phosphorus source is ammonium hydrogen phosphate, and the carbon source is sucrose.

In a second aspect, the embodiments of the present application provide an electrode that comprises lithium manganese iron phosphate cathode material obtained by any of the preparation methods described in the first aspect.

In the present application, the lithium manganese iron phosphate cathode material is prepared by doping manganese metal ions into the lithium iron phosphate material through metal ion implantation to make the electrode. This reduces the band gap width of lithium iron phosphate, thereby increasing the conductivity of the lithium manganese iron phosphate material, and consequently enhancing the discharge specific capacity of the lithium battery made from the lithium manganese iron phosphate cathode material.

In the third aspect, the present application provides a lithium battery, where the cathode of the lithium battery is made from the lithium iron phosphate cathode material obtained by the preparation method described in any item of the first aspect.

In the present application, the lithium manganese iron phosphate cathode material is prepared by doping manganese metal ions into lithium iron phosphate material through metal ion implantation to make electrodes for lithium batteries, which reduces the band gap width of lithium iron phosphate, thereby increasing the conductivity of the lithium manganese iron phosphate material, and consequently enhancing the discharge specific capacity of the lithium battery.

To ensure that the above implementation details and operations of the present application can be clearly understood by those skilled in the art, and to significantly demonstrate the improved performance of the preparation method, electrode, and lithium battery of a lithium iron phosphate cathode material in the present application, the following examples are provided to illustrate the above technical solutions.

Example 1

Using lithium carbonate, ferrous oxalate, and ammonium hydrogen phosphate as the lithium source, iron source, and phosphorus source respectively, and sucrose as the carbon source, with the amount of sucrose being 15 wt % of the total weight of lithium carbonate, ferrous oxalate, ammonium hydrogen phosphate, and sucrose, the above four raw materials are placed into a ball mill jar according to the stoichiometric ratio. Ball milling is performed at a speed of 450 r/min for 4.2 hours in the presence of a ball milling medium and alcohol environment. The milled slurry is then dried in a blast oven to obtain the lithium iron phosphate precursor.

The lithium iron phosphate precursor is presintered at 680° C. in a nitrogen atmosphere for 18 hours, and then calcined at 750° C. for 13 hours to obtain the lithium iron phosphate material (LiFePO4).

The obtained lithium iron phosphate material is processed into thin flakes with a thickness of 5 μm, placed into the metal vapor vacuum arc power supply ion implantation equipment, and the vacuum degree of the ion implantation equipment chamber is adjusted to be less than $1\times10^{-4}$ Pa. Metal manganese ions are used to perform ion implantation on both sides of the flaky lithium iron phosphate material, with ion implantation parameters as follows: ion voltage is 100 keV, and manganese ion implantation amount is $4\times10^9$ ions/cm$^2$, resulting in lithium manganese iron phosphate cathode material.

Example 2: The difference from Example 1 lies in the adjustment of ball milling parameters, segmented sintering parameters, and ion implantation parameters.

Using lithium carbonate, ferrous oxalate, and ammonium hydrogen phosphate as the lithium source, iron source, and phosphorus source respectively, and sucrose as the carbon source, with the amount of sucrose being 15 wt % of the total weight of lithium carbonate, ferrous oxalate, ammonium hydrogen phosphate, and sucrose. The four raw materials are placed into a ball mill jar according to the stoichiometric ratio and ball milled at a speed of 370 r/min for 4.0 hours in a ball milling medium and alcohol environment. The ball-milled slurry is then dried in a blast oven to obtain the lithium iron phosphate precursor.

The lithium iron phosphate precursor is presintered at 450° C. in a nitrogen atmosphere for 16 h, and then further calcined at 785° C. for 15 h to obtain the lithium iron phosphate material (LiFePO$_4$).

The obtained lithium iron phosphate material is processed into thin flakes with a thickness of 5 µm, placed into the metal vapor vacuum arc power supply ion implantation equipment, and the vacuum degree of the ion implantation equipment chamber is adjusted to be less than 1×10$^{-4}$ Pa. Metal manganese ions are used to perform ion implantation on both sides of the flaky lithium iron phosphate material. The ion implantation parameters are: ion voltage of 100 keV, and manganese ion implantation dose of 9×10$^9$ ions/cm$^2$, resulting in the lithium manganese iron phosphate cathode material.

Example 3: The difference from Example 1 lies in the adjustment of ball milling parameters, segmented sintering parameters, and ion implantation parameters:

Using lithium carbonate, ferrous oxalate, and ammonium hydrogen phosphate as the lithium source, iron source, and phosphorus source respectively, and sucrose as the carbon source, with the amount of sucrose being 15 wt % of the total weight of lithium carbonate, ferrous oxalate, ammonium hydrogen phosphate, and sucrose. The above four raw materials are placed into a ball mill jar according to the stoichiometric ratio and ball milled at a speed of 350 r/min for 3.7 hours in a ball milling medium and alcohol environment. The ball-milled slurry is then dried in a blast oven to obtain the lithium iron phosphate precursor.

The lithium iron phosphate precursor is presintered at 480° C. in a nitrogen atmosphere for 12 h, and then calcined at 700° C. for 14 h to obtain the lithium iron phosphate material (LiFePO$_4$).

The obtained lithium iron phosphate material is processed into thin flakes with a thickness of 5 µm, placed into the metal vapor vacuum arc power supply ion implantation equipment, and the vacuum degree of the ion implantation equipment chamber is adjusted to be less than 1×10$^{-4}$ Pa. Metal manganese ions are used to perform ion implantation on both sides of the flaky lithium iron phosphate material, with ion implantation parameters as follows: ion voltage is 100 keV, and manganese ion implantation dose is 8×10$^{10}$ ions/cm$^2$, resulting in lithium manganese iron phosphate cathode material.

Example 4: The difference from Example 1 lies in the adjustment of ball milling parameters, segmented sintering parameters, and ion implantation parameters:

Using lithium carbonate, ferrous oxalate, and ammonium hydrogen phosphate as the lithium source, iron source, and phosphorus source respectively, and sucrose as the carbon source, with the amount of sucrose being 15 wt % of the total weight of lithium carbonate, ferrous oxalate, ammonium hydrogen phosphate, and sucrose. The above four raw materials are placed into a ball mill jar in stoichiometric proportions and ball milled at a speed of 450 r/min for 3.2 hours in a ball milling medium and alcohol environment. The ball-milled slurry is then dried in a blast oven to obtain the lithium iron phosphate precursor.

The lithium iron phosphate precursor is presintered at 435° C. in a nitrogen atmosphere for 15 hours, and then calcined at 780° C. for 12 hours to obtain lithium iron phosphate material (LiFePO$_4$).

The obtained lithium iron phosphate material is processed into thin flakes with a thickness of 5 µm, placed into the metal vapor vacuum arc power supply ion implantation equipment, and the vacuum degree of the ion implantation equipment chamber is adjusted to be less than 1×10$^{-4}$ Pa. Metal manganese ions are used to perform ion implantation on both sides of the flaky lithium iron phosphate material. The ion implantation parameters are: ion voltage of 100 keV and manganese ion implantation dose of 1×10$^{11}$ ions/cm2, resulting in lithium manganese iron phosphate cathode material.

Example 5: The difference from Example 1 lies in the adjustment of ball milling parameters, segmented sintering parameters, and ion implantation parameters:

Using lithium carbonate, ferrous oxalate, and ammonium hydrogen phosphate as the lithium source, iron source, and phosphorus source respectively, and sucrose as the carbon source, with the amount of sucrose being 15 wt % of the total weight of lithium carbonate, ferrous oxalate, ammonium hydrogen phosphate, and sucrose. The above four raw materials are placed into a ball mill jar according to the stoichiometric ratio and ball milled at a speed of 500 r/min for 2.8 hours in a ball milling medium and alcohol environment. The ball-milled slurry is then placed in a blast oven to dry, resulting in a lithium iron phosphate precursor.

The lithium iron phosphate precursor is presintered at 460° C. in a nitrogen atmosphere for 15 hours, and then calcined at 780° C. for another 15 hours to obtain the lithium iron phosphate material (LiFePO$_4$).

The obtained lithium iron phosphate material is processed into thin flakes with a thickness of 5 µm, placed into the metal vapor vacuum arc power supply ion implantation equipment. The vacuum degree of the ion implantation equipment chamber is adjusted to be less than 1×10-4 Pa, and metal manganese ions are used to perform ion implantation on both sides of the flaky lithium iron phosphate material. The ion implantation parameters are: ion voltage of 100 keV, and manganese ion implantation dose of 4×10$^{11}$ ions/cm$^2$, resulting in the lithium manganese iron phosphate cathode material.

Comparative Example 1

Using lithium carbonate, ferrous oxalate, manganese acetate, and ammonium hydrogen phosphate as the lithium source, iron source, manganese source, and phosphorus source respectively, and using sucrose as the carbon source, with the amount of sucrose being 15 wt % of the total weight of lithium carbonate, ferrous oxalate, ammonium hydrogen phosphate, manganese acetate, and sucrose, the above five raw materials are placed into a ball mill jar according to the stoichiometric ratio. Ball milling is performed at a speed of 450 r/min for 4.2 hours in the presence of a ball milling medium and alcohol environment. The ball-milled slurry is then dried in a blast oven to obtain the lithium iron phosphate precursor.

The precursor is presintered at 680° C. in a nitrogen atmosphere for 18 h, and then calcined at 750° C. for 13 h to obtain material LiFe$_{0.5}$Mn$_{0.5}$PO$_4$.

Performance/Data Testing:

The lithium manganese iron phosphate cathode materials prepared in Examples 1 to 5 and Comparative Example 1 were subjected to band gap width testing, 0.1 C charge specific capacity testing, 0.1 C discharge specific capacity testing, and 1 C cycle 100 times efficiency testing. For comparison, see Table 1 for detailed test data:

TABLE 1

Performance test data of lithium manganese iron phosphate cathode materials in each embodiment and each comparative example

| | Band gap width Eg/eV | Initial discharge specific capacity at 0.1 C/mAh/g | Cycle efficiency/% |
|---|---|---|---|
| Embodiment 1 | 0.529 | 139.5 | 92.1 |
| Embodiment 2 | 0.470 | 151.3 | 94.2 |
| Embodiment 3 | 0.421 | 161.2 | 97.7 |
| Embodiment 3 | 0.427 | 157.0 | 96.3 |
| Embodiment 4 | 0.496 | 142.5 | 92.3 |
| Comparative Example 1 | 0.549 | 136.7 | 90.5 |

As can be seen from Table 1, compared to Comparative Example 1, which uses the traditional solid-state method to prepare lithium manganese iron phosphate material, the ion implantation method introduces the metal element manganese into the lithium iron phosphate material, reducing the band gap width of the lithium manganese iron phosphate material. This increases the conductivity of the lithium manganese iron phosphate material, thereby enhancing the discharge specific capacity and cycle efficiency of the lithium battery. To some extent, this addresses the issue of the discharge specific capacity of the doped lithium iron phosphate material not meeting the requirements. It should be noted that after the manganese ion implantation amount is increased to a certain extent, with the saturation of the manganese ion doping concentration, the band gap width will no longer decrease, and thus the discharge specific capacity and cycle efficiency of the lithium battery will no longer improve.

It should be understood that the order of the steps in the above examples does not imply the sequence of execution. The execution order of each process should be determined by its function and internal logic, and should not impose any limitation on the implementation process of the present application example.

In the above examples, the descriptions of each example have their own focus. Parts not detailed or recorded in a particular example can be referred to in the relevant descriptions of other examples.

The above-described embodiments are only intended to illustrate the technical solutions of the present application and not to limit them. Although the present application has been described in detail with reference to the aforementioned embodiments, those skilled in the art should understand that they can still modify the technical solutions described in the aforementioned embodiments or make equivalent replacements for some of the technical features. These modifications or replacements do not depart from the spirit and scope of the technical solutions of the embodiments of the present application and should be comprised within the protection scope of the present application.

What is claimed is:

1. A preparation method for lithium manganese iron phosphate cathode material, the preparation method comprising:

mixing a lithium source, an iron source, a phosphorus source, and a carbon source to provide a mixture, grinding and drying the mixture to obtain a lithium iron phosphate precursor;

subjecting the lithium iron phosphate precursor to a first and second stage sintering in an inert gas atmosphere to obtain lithium iron phosphate material;

processing the lithium iron phosphate material into a flaky form comprising flakes of lithium iron phosphate having first and second sides separated by a thickness, and performing ion implantation of manganese ions on both sides of the flaky lithium iron phosphate material in a vacuum environment to obtain lithium manganese iron phosphate cathode material;

wherein the performing ion implantation of manganese ions on both sides of the flaky lithium iron phosphate material in a vacuum environment to obtain lithium manganese iron phosphate cathode material, comprises:

performing ion implantation using manganese ions on the first surface of the flaky lithium iron phosphate material in the vacuum environment until a preset depth of manganese implantation is reached;

performing ion implantation using manganese ions on the second surface of the flaky lithium iron phosphate material in the vacuum environment until the preset depth of manganese implantation is reached, wherein the second surface is opposite to the first surface, thereby obtaining the lithium manganese iron phosphate cathode material having a band gap width which is reduced to less than 0.549 eV;

wherein, the manganese ions are implanted into the flaky lithium iron phosphate material to also reduce the band gap width of the lithium manganese iron phosphate cathode material.

2. The preparation method according to claim 1, characterized in that the preset depth of manganese implantation is 1 μm to 1.5 μm.

3. The preparation method according to claim 1, characterized in that the mode of the grinding is ball milling performed at a ball milling speed of 300 r/min to 500 r/min, and a ball milling time of 2.8 h to 4.8 h.

4. The preparation method according to claim 1, characterized in that the first stage of sintering is performed at a sintering temperature of 320° C. to 550° C., and a sintering time of 10 h to 16 h, and the second stage of sintering is performed at a sintering temperature is 600° C. to 900° C., and a sintering time is 12 h to 18 h.

5. The preparation method according to claim 1, characterized in that the thickness of the flaky lithium iron phosphate material is 3 μm to 5 μm.

6. The preparation method according to claim 1, characterized in that the ion implantation is performed at an ion voltage is 80 keV to 150 keV, and the manganese ion implantation amount is $2 \times 10^9$ ions/cm$^2$ to $5 \times 10^{11}$ ions/cm$^2$.

7. The preparation method according to claim 1, characterized in that the lithium source is lithium carbonate, lithium hydroxide, lithium dihydrogen phosphate, or a combination thereof;

and/or the iron source is ferric oxide, iron phosphate, ferrous oxalate, ferrous acetate, or a combination thereof;

and/or the phosphorus source is lithium dihydrogen phosphate, ammonium hydrogen phosphate, ammonium dihydrogen phosphate, diammonium hydrogen phosphate, phosphoric acid, or a combination thereof;

and/or the carbon source is glucose, sucrose, polyethylene glycol, maltose, phenolic resin, carbon nanotubes, epoxy resin, or a combination thereof;

and/or the inert gas comprises at least one of nitrogen, argon, or helium.

8. The preparation method according to claim 1, characterized in that the amount of the carbon source is 15 wt % to 18 wt % of the total weight of the lithium source, the iron source, the phosphorus source, and the carbon source.

9. The preparation method according to claim 1, characterized in that the vacuum environment comprises a pressure less than or equal to $1\times10^{-4}$ Pa.

10. An electrode comprising: a lithium manganese iron phosphate cathode material obtained by the preparation method according to claim 1.

11. A lithium battery, characterized in that the cathode of the lithium battery comprises a lithium iron phosphate cathode material obtained by the preparation method according to claim 1.

* * * * *